United States Patent
Epworth et al.

(10) Patent No.: US 6,483,620 B1
(45) Date of Patent: *Nov. 19, 2002

(54) POLARIZATION MODE DISPERSION MEASUREMENT

(75) Inventors: Richard Edward Epworth, Sawbridgeworth; Kevin Stuart Farley, Bishop's Stortford; Alan Robinson, Harlow, all of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/231,433

(22) Filed: Jan. 14, 1999

(30) Foreign Application Priority Data

Aug. 28, 1998 (GB) .............................. 9818940

(51) Int. Cl.[7] .............................................. H04B 10/00
(52) U.S. Cl. ........................................ 359/156; 359/158
(58) Field of Search ................................. 359/156, 161, 359/192, 158, 189, 122, 110, 181

(56) References Cited

U.S. PATENT DOCUMENTS

| | | | | |
|---|---|---|---|---|
| 4,801,189 A | * | 1/1989 | Shaw | 359/96.15 |
| 5,345,331 A | * | 9/1994 | Bergano et al. | 359/341 |
| 5,473,457 A | | 12/1995 | Ono | 359/161 |
| 5,491,576 A | * | 2/1996 | Bergano | 359/156 |
| 5,526,162 A | * | 6/1996 | Bergano | 359/181 |
| 5,659,412 A | | 8/1997 | Hakki | 359/156 |
| 5,912,755 A | * | 6/1999 | Bergano | 359/181 |
| 5,946,119 A | * | 8/1999 | Bergano et al. | 359/124 |
| 5,949,560 A | * | 9/1999 | Roberts et al. | 359/110 |
| 6,057,950 A | * | 5/2000 | Bergano | 359/181 |

* cited by examiner

*Primary Examiner*—Leslie Pascal
*Assistant Examiner*—David C. Payne
(74) *Attorney, Agent, or Firm*—Lee, Mann, Smith, McWilliams, Sweeney & Ohlson

(57) ABSTRACT

A method of measuring the polarization mode dispersion (PMD) of an optical transmission path carrying clocked digital data traffic involves modulating the state of polarization (SOP) of the light launched into the transmission path, and detecting consequential frequency components in an electrical signal detected at the far end of the transmission path. The SOP modulation, when represented on a Poincaré sphere, has an oscillatory rotational component at a frequency $f_1$ about a first axis of the sphere and an oscillatory rotational component at a frequency $f_2$ about a second axis of the sphere that is orthogonal to said first axis, and where $f_1 \neq f_2$, $f_1 \neq 2f_2$, and $f_2 \neq 2f_1$.

4 Claims, 5 Drawing Sheets

POLARIZATION MODE DISPERSION MEASUREMENT

BACKGROUND OF THE INVENTION

When nominally circularly symmetric optical fibre is employed as a long distance transmission path from an optical transmitter to an optical receiver, the departures from perfect circular symmetry of that fibre can be of a sufficient magnitude for the fibre to function as a concatenation of birefringent elements of random relative orientation. Moreover that orientation is liable to change with time.

When polarised light of any particular wavelength is transmitted through a single element exhibiting uniform birefringence, that light is, in general, resolved into two components (modes) propagating with two specific different velocities, and so possessing different transit times of propagation through that element. For each of two particular orthogonal states of polarisation (SOPs), known as the principal SOPs, the light is not resolved into different components, but propagates at a single velocity with a single transit time, i.e. propagates as a single (polarisation) mode. These principal SOPs are aligned with the principal axes of birefringence of the element. For light launched into the element with either one of these two principal SOPs, the SOP of the light remains unchanged in its passage through the element. For light launched into the element with any other SOP, that light is resolved in its passage through the element into two orthogonal components aligned with the principal axes of the element and propagating with different velocities. As the result in the velocity difference, the relative phase of the two components at the far end of the element is generally not the same as that at the launch (input) end, and so the light emerging at the far end generally emerges with an SOP that is different from that with which it entered the element. This characteristic can be conceptualised as the SOP of the light evolving in a cyclic manner in its passage through the element.

When polarised light is transmitted through a concatenation of elements, each exhibiting uniform birefringence, but whose principal axes are not all co-aligned, then, even if that light is not resolved into two components by the first element of the concatenation, it will be so resolved by a later element. Then each of those two elements will itself be resolved into two further components by an element further along the concatenation, and so on. It can be demonstrated that for any such concatenation there exists a specific pair of orthogonal SOPs having the property that light launched with either SOP into the concatenation propagates through it with a single transit time. The transit is faster for one of the SOPs than for the other, and the differencing transit time, the differential group delay (DGD), is a measure of the first order polarisation mode dispersion (PMD) of the concatenation. (the term first order PMD is employed in this specification to denote the DGD in respect of a particular wavelength, thereby excluding from its ambit consideration of second order PMD effects which describe the wavelength dependence of that DGD.) For neither one of this specific pair of orthogonal SOPs is the launch SOP maintained in the pas sage of the light through the concatenation, and the light emerges at the far end with an SOP that is in general different from that with which it was launched. The emergent SOP for one of the single transit time launch SOPs is orthogonal to the emergent SOP for the other single transit time launch SOP. For any launch SOP that is not one of the single transit time launch SOPs, the emergent light is composed of two components (polarisation modes), generally of unequal amplitude, which have propagated through the concatenation with different transit times, respectively the previously mentioned fast and slow single transit times of the concatenation.

By analogy with the single uniform birefringence element situation, the two single transit time launch SOPs for the concatenation are often referred to as the principal SOPs of the concatenation. Having regard to the fact that for such a concatenation the single transit time input (launch) SOPs are, in general, different from t he corresponding output (emergence) SOPs, reference in this specification will be made to input principal SOPs (IPSPS) and to output principal SOPs (OPSPs). From consideration of principles of reciprocity, it will be evident that the IPSPs for one direction of propagation through the concatenation are the OPSPs for the other, and vice versa.

The presence of first order polarisation mode dispersion (PMD) in a transmission path—the difference between the fast and slow single transit times (DGD)—is liable to be a problem when its magnitude becomes significant compared With the bit period of traffic propagating in the transmission path. Under these circumstances there will be significant pulse broadening at the receiver when bits are launched into the transmission path with an SOP that the transmission path divides into fast and slow single transit time components (modes) of equal power. In principle, this pulse broadening effect could be avoided by taking steps to ensure that the bits are always launched into the transmission path with SOPs matched with one of the IPSPs of the transmission path so that they always propagate, either exclusively with the fast transit time, or exclusively with the slow one, i.e. so that they always propagate in a single mode. However there are difficulties with achieving this in practice. The primary reason for this is that the IPSPs vary with time, and so an active SOP alignment system would be required. Additionally, identification of the IPSPs typically requires access to both ends of the transmission path, and so the active SOP alignment system situated at the transmitter end of the transmission path would require a feedback control signal from the receiver end of that transmission path.

An alternative approach to the avoidance of the problems presented by first order PMD is a compensation approach that involves allowing the bits to be launched into the transmission path with an SOP that the transmission path divides into two components (modes) propagating with different (fast and slow) transit times, and providing an active system at the receiver end which separates the two components, subjects the separated components to controlled variable differential delay to restore synchronisation of the components, and then recombines them.

An example of the PMD compensation approach is described in U.S. Pat. No. 5,659,412. At the receiver, the signal received from the transmitter via the transmission path is fed to a polarisation beam splitter via a polarisation state controller. The outputs of the polarisation beam splitter are fed to separate detectors provided with associated clock extraction circuits, and the phase relationship between the two extracted clock signals is determined. The resulting phase difference signal is used to control the polarisation state controller in such a way as to maximise the phase difference. This phase difference is at a maximum when the polarisation state controller is operative to map the OPSPs of the transmission path on to the principal polarisation states of the polarisation beam splitter, and under these conditions the polarisation beam splitter is operative to separate the component of the signal launched into the transmission path that propagates through it with the 'fast' transit time from the component that propagates through it with the 'slow' transit time. In one of the embodiments specifically described, the electrical output of the detector providing the phase-leading clock signal is delayed by the amount corresponding to the measured phase difference between the two extracted clock signals, the DGD, and then the two electrical signals are combined. In the other embodiment specifically described, the two detectors receive only a tapped fraction of the total optical power outputs from the polarisation beam splitter, while the remainder of that power, after the imposition of an optical delay upon the leading component, is optically combined and detected using a third detector. Thus it is seen that the approach of U.S. Pat. No. 5,659,412 necessarily requires the use of at least two detectors capable of operating at the bit rate, some embodiments requiring three such detectors. Moreover operation of the device is complicated by the need to allow for the occurrence of occasions in which either one of the IPSPs of transmission path approaches land passes through coincidence with the SOP of the signal being launched into that transmission path. Under these conditions there is a large disparity in power level between the two outputs of the polarisation beam splitter.

An alternative approach, the approach with which the present invention is concerned, is to forgo compensation for the effects of PMD, but instead to rely upon on-line measurement of the magnitude of the PMD to provide an output that can be employed to determine the maximum safe bit rate that can be handled by the transmission path at that time.

There is a variety of situations in which measurement of PMD is useful on its own, without having recourse to any attempt to provide compensation for that PMD. For instance, measurement of PMD without compensation can be useful in the monitoring of a transmission path carrying traffic at one bit rate for assessment of its suitability for carrying traffic at a higher rate (e.g. suitability for uprating from 2.4 Gbit/s to 10 Gbit/s. In networks in which most of the regenerated spans exhibit relatively low PMD, but in which a few may exhibit marginally acceptable PMD, it may be important to identify those spans likely to be the cause of errors. A PMD monitor enables PMD related faults to be identified. A monitoring of changes in level of PMD can be used to control a protection switch operated to reroute traffic whenever the PMD of a link temporarily exceeds its mean value by an amount large enough to make any further increase likely to produce PMD-induced outage.

SUMMARY OF THE INVENTION

An object of the invention is to provide a method of measuring first order PMD of a transmission path while it is being used for the transmission of data. This objective is accomplished by arranging to modulate (dither) the polarisation state of light launched into the transmission path. This modulation is of a form that, when represented on a Poincaré sphere, has an oscillatory rotational component at a frequency $f_1$ about a first axis of the sphere, and an oscillatory rotational component at a frequency $f_2$ about a second axis of the sphere that is orthogonal to the first axis, and where $f_1 \neq f_2$, $f_1 \neq 2f_2$, and $f_2 \neq 2f_1$. Given knowledge of the initial amplitudes of the $f_1$ and $f_2$ modulations, a measure of the PMD of the transmission path is ascertainable from a measure of the amplitudes of the components of the received clock at the receiver at frequencies $f_1$, $f_2$, $2f_1$ and $2f_2$.

Other features and advantages of the invention will be readily apparent from the following description of preferred embodiments of the invention from the drawings and from the claims.

DETAILED DESCRIPTION OF THE DRAWINGS

Figure 1:
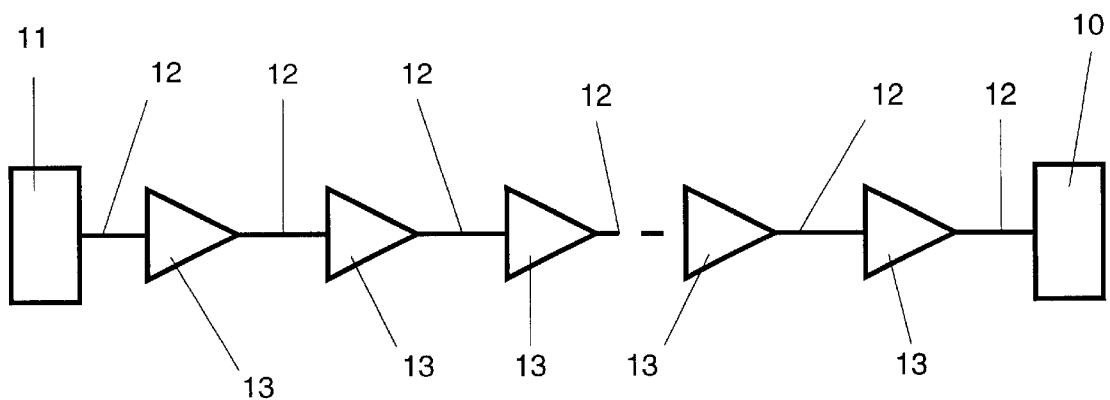
FIG. 1 is a schematic diagram of an optical transmission system.
Figure 2:
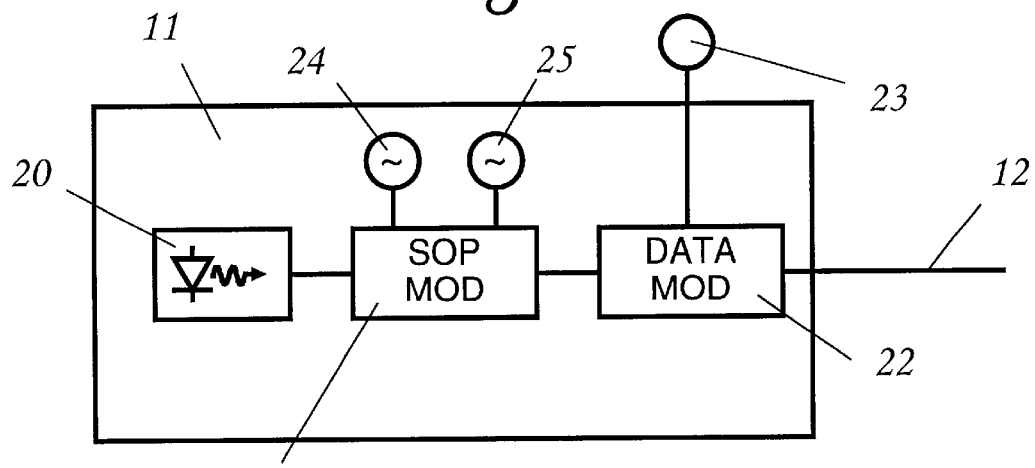
FIGS. 2 and 3 are schematic diagrams respectively of the transmitter and receiver of the optical transmission system of FIG. 1, FIGS. 4, 5 and 6 are Poincaré diagrams illustrating the SOP modulation applied by the SOP modulator of the transmitter of FIG. 2.
Figure 3:
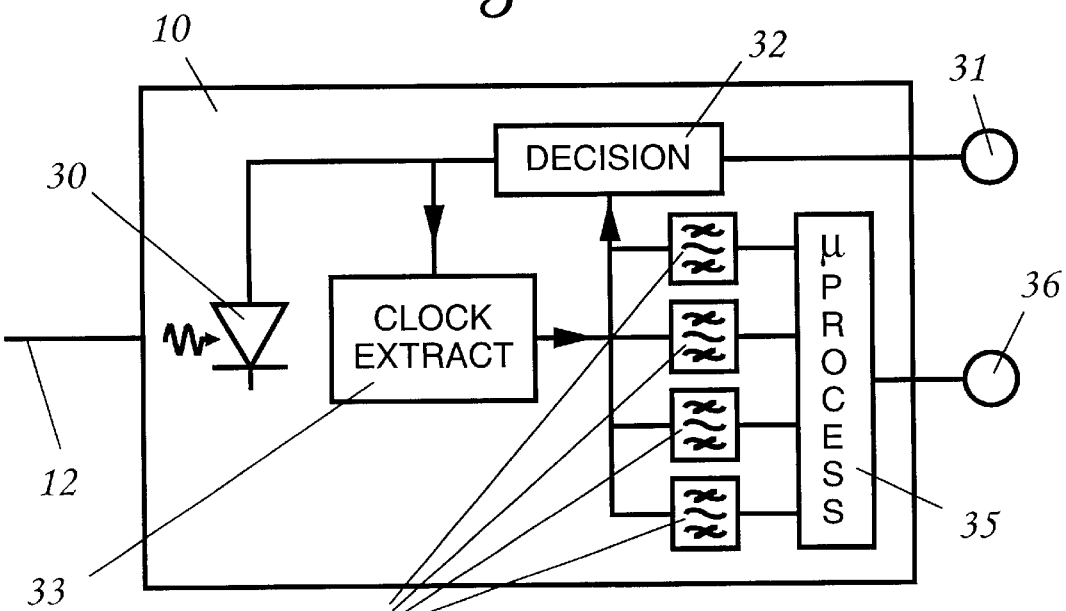

Referring to FIG. 1, an optical receiver 10 is optically coupled with an optical transmitter 11 via an optical fibre transmission path 12 that exhibits polarisation mode dispersion (PMD), and that may include along its length one or more optical amplifiers 13, for instance optically pumped erbium doped fibre amplifiers. The major components of the optical transmitter 11 are schematically depicted in FIG. 2, and comprise an optical source 20 emitting polarised light, such as a semiconductor laser diode; a polarisation state modulator (ditherer) 21; and a data modulator 22 that digitally modulates the optical output of the optical source 20 with clocked data applied by way of terminal 23. (In FIG. 2, the polarisation state modulator 21 is specifically illustrated as preceding the data modulator 22, but it may be preferred, or indeed necessary, to reverse this order. For instance, the reverse order is necessary if the data modulator is of a form that requires a specific SOP, such is generally the case in respect of lithium niobate modulators.) The polarisation modulator is driven by two oscillators 24 and 25 respectively operating at frequencies $f_1$ and $f_2$, where $f_1 \neq f_2$, $f_1 \neq 2f_2$, and $f_2 \neq 2f_1$. The output of oscillators 24 and 25 are employed by the SOP modulator 21 to modulate the SOP of the light directed into the modulator in a manner which, when represented on a Poincaré sphere, have oscillatory rotational components respectively at the frequencies $f_1$ and $f_2$ respectively about first and second orthogonal axes of the sphere. Correspondingly, the major components of the optical receiver 10 are schematically depicted in FIG. 3, and comprise a photodetector 30 whose electrical output is fed to an output terminal 31 of the receiver via decision circuitry 32, and also to a clock extraction circuit 33. The output of the clock extraction circuit provides a clock input signal to regulate the operation of the decision circuitry 32, and is also fed to four filters 34 respectively tuned to the frequencies $f_1$, $f_2$, $2f_1$ and $2f_2$. The outputs of these four filters are fed to a microprocessor 35 adapted to perform, after calibration of the instrument using a test length of transmission medium of known first order PMD, the requisite algorithm upon the outputs of the filters to provide a PMD measure on output 36.

Figure 4:
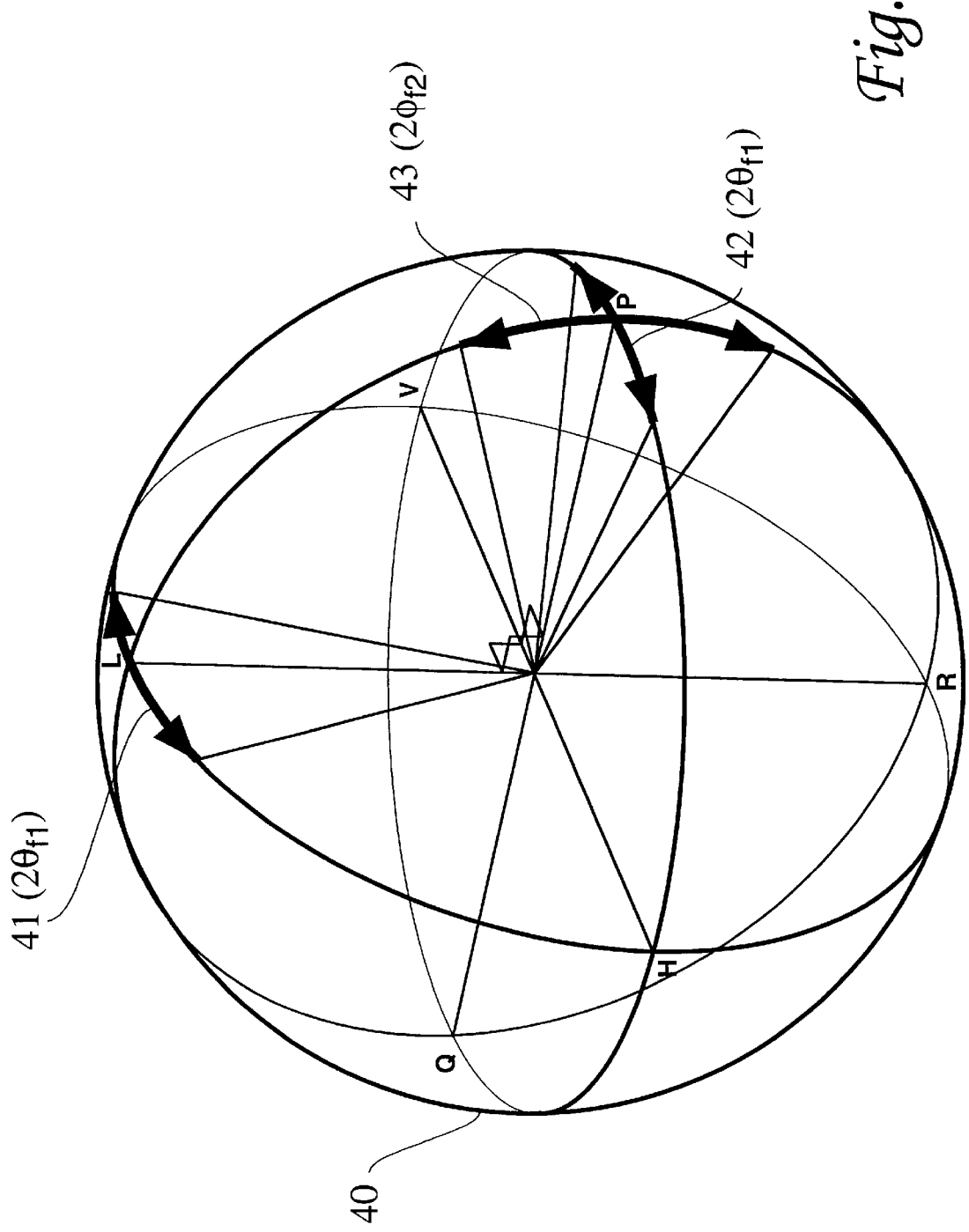
Figure 5:
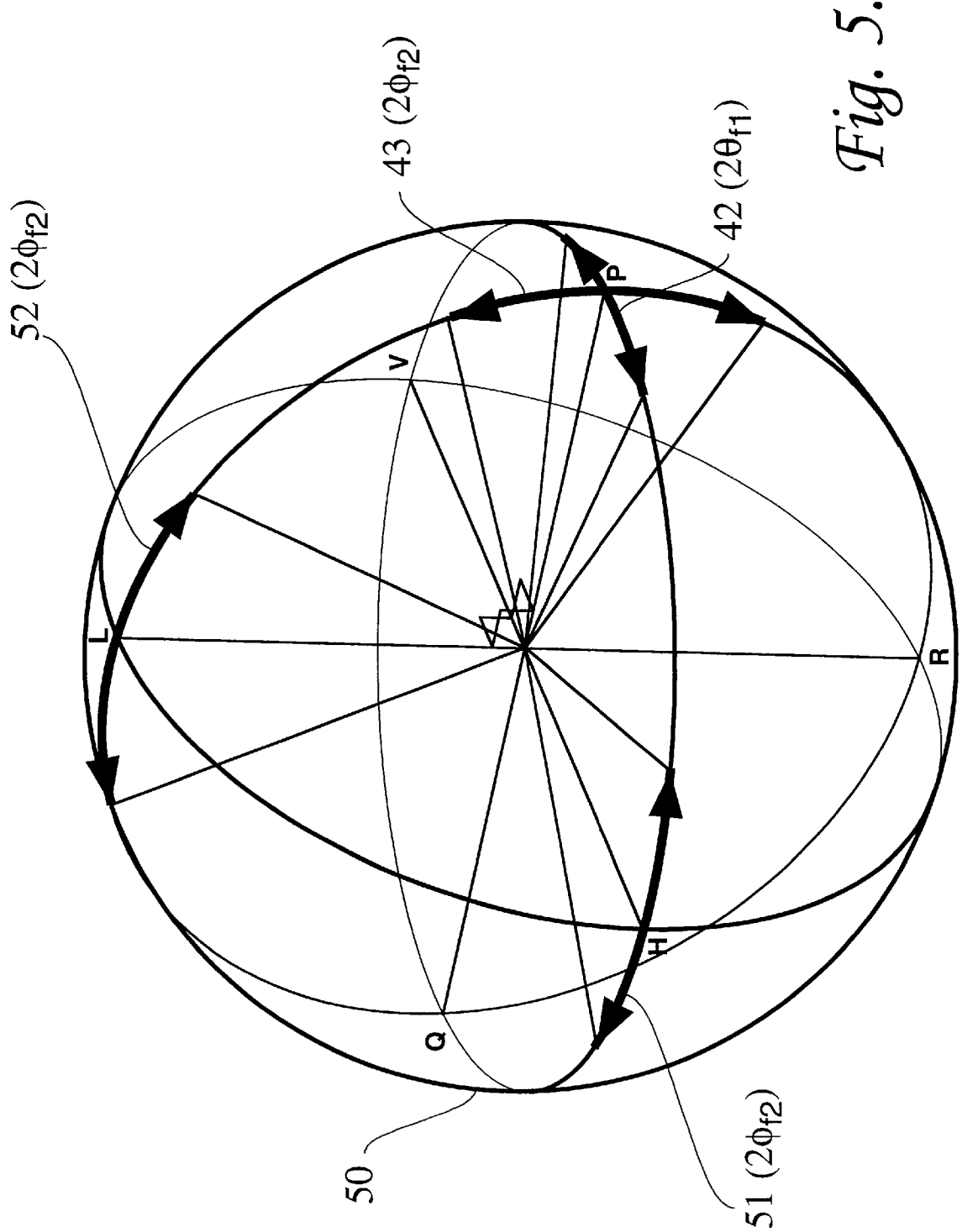

The way in which the SOP modulation at frequencies $f_1$ and $f_2$ provided by the SOP modulator 21 of the transmitter 20 gives rise to amplitude modulation, at frequencies $f_1$, $f_2$, $2f_1$, and $2f_2$, of the clock signal extracted at the receiver 10 by clock extraction circuitry 33 is conveniently explained by reference to the Poincaré sphere diagrams of FIGS. 4, 5 and 6. A Poincaré sphere is a way of representing all possible states of polarisation of light (linearly, circularly and elliptically polarised states) as points on the surface of a sphere. In the case of the Poincaré sphere 40 of FIG. 4 the poles L and R represent circularly polarised states. On the great circle 'equator' through HQV and P are represented all the linearly polarised states, and between the poles and the equator lie all the elliptically polarised states. It may be noted that any pair of orthogonally polarised states lie at diametrically opposed points on the Poincaré sphere. When polarised light is transmitted through a medium exhibiting uniform birefringence, the SOP with which the light is launched into the medium is generally different from that with which the light emerges from that medium. However there is a particular pair of orthogonal SOPs for which launch, and emergence SOPs are identical. These two orthogonal SOPs are termed eigenstate SOPs, and define the eigenaxis of that medium. The change in SOP produced by passage of polarised light through the medium is represented by a rotation on the Poincaré sphere about the eigenaxis through an angle determined by the strength of the birefringence. In the case of materials exhibiting linear birefringence, such as a uniaxial crystal of calcite, the eigenstates are linearly polarised SOPs, and so the eigenaxis lies in the equatorial plane of the Poincaré sphere of FIG. 4. Linear birefringence is also exhibited by optical fibre that does not possess perfect circular symmetry, for instance as the result of providing the fibre core with a structure producing a non-circularly symmetric lateral component of strain. In this instance the strength of the linear birefringence exhibited by the fibre is adjustable by the application of an adjustable amount of additional lateral strain, for instance by squeezing the fibre. If therefore the light from the source 20 enters the SOP modulator 21 in the form of linearly polarised light, the SOP modulator may be composed of two frequency modulated squeezer elements, for instance piezoelectrical squeezer elements operating in tandem upon the fibre. In respect of one preferred embodiment, if the SOP of the light entering the SOP modulator 21 is represented by the point H on the Poincaré sphere 40 of FIG. 4, then the orientation of the first piezoelectric squeezer element of the SOP modulator 21 is oriented so that its eigenaxis lies along the line PQ. The mean retardation provided by this first squeezer element is chosen to be $\lambda/4$, and so is represented on the Poincaré sphere as $\pi/2$ rotation in the clockwise sense as seen from the P end of the eigenaxis. Superimposed upon this $\pi/2$ rotation is an oscillatory modulation at the frequency $f_1$ of an amplitude that corresponds to the sweeping out of an arc 41 on the Poincaré sphere 46 that lies on the great circle through HLV and P, is centred on L, and subtends an angle $2\theta$ at the centre of the sphere. The second piezoelectric squeezer element of the SOP modulator 21 is then oriented so that its direction of squeeze is aligned at $\pi/4$ with respect to that of the first squeezer element. The eigenaxis of the second squeezer element is therefore at $\pi/2$ on the Poincaré sphere with respect to that of the first squeezer element, i.e. the eigenaxis of the second squeezer element is along the direction HV. The mean rotation provided by this second squeezer element is also chosen to be $\lambda/4$ and is represented on the Poincaré sphere as a $\pi/2$ rotation in the clockwise sense as seen from the H end of its eigenaxis. The arc 41 is therefore mapped on to the position of arc 42 which lies on the equatorial great circle through HQV and P, is centred on P, and similarly subtends an angle $2\theta$ at the centre of the sphere. Superimposed on this $\pi/2$ rotation is an oscillatory modulation at the frequency $f_2$ of an amplitude that, in the absence of the $f_1$ modulation of the first squeezer element, corresponds to the sweeping out of an arc 43 which lies on the great circle through QLP and R is centred on P and subtends an angle $2\phi$ at the centre of the sphere.

It is not necessary for both retarders of the SOP modulator to be variable strength linear birefringence retarders. Either or both may alternatively be variable strength circular birefringence retarders. Such a device may for instance be constituted by a Faraday rotator. An alternative form of variable strength circular birefringence retarder, one which does not employ bulk optics, but in which the light propagates from end to end in an optical fibre, is the type of device described in U.S. Pat. No. 5,115,480 with particular reference to its FIGS. 1, 2 and 3.

The manner of operation of an alternative embodiment of SOP modulator 21, one that employs a pair of variable strength circular birefringence retarders, will now be explained with reference to the Poincaré sphere of FIG. 5. As before, the light entering the SOP modulator is plane polarised in a direction represented by the point H. The first variable strength circular birefringence retarder of the SOP modulator is driven with an oscillatory signal of frequency $f_2$ with an amplitude that corresponds to the sweeping out of an arc 51 on the Poincaré sphere 50 that lies on the equatorial great circle through HQV and P, is centred on H, and subtends an angle $2\phi$ at the centre of the sphere. Between this first variable strength circular birefringence retarder and the second are located two quarter-wave (fixed strength) linear birefringence retarders. The first of these quarter-wave retarders is oriented so that, on the Poincaré sphere, its eigenaxis is aligned in the direction PQ, and so this quarter-wave retarder has the effect of mapping the arc 51 on to the arc 52 that lies on the great circular through HLV and R, is centred on L, and similarly subtends an angle $2\phi$ at the centre of the sphere. The second of the quarter-wave linear birefringence retarders is oriented at 45° to the first so that, on the Poincaré sphere, its eigenaxis is aligned in the direction HV. Accordingly this second quarter-wave retarder has the effect of mapping the arc 52 on to the arc 43, that lies on the great circle QLP and R, is centred on P, and also subtends an angle $2\phi$ at the centre of the sphere. The second variable strength circular birefringence retarder is driven with an oscillatory signal of frequency $f_1$ with an amplitude that, in the absence of the $f_2$ modulation of the first variable strength circular birefringence retarder, corresponds to the sweeping out of the arc 42 which lies on the equatorial great circle through HQV and P, is centred on P, and subtends an angle $2\phi$ at the centre of the sphere.

Figure 6:
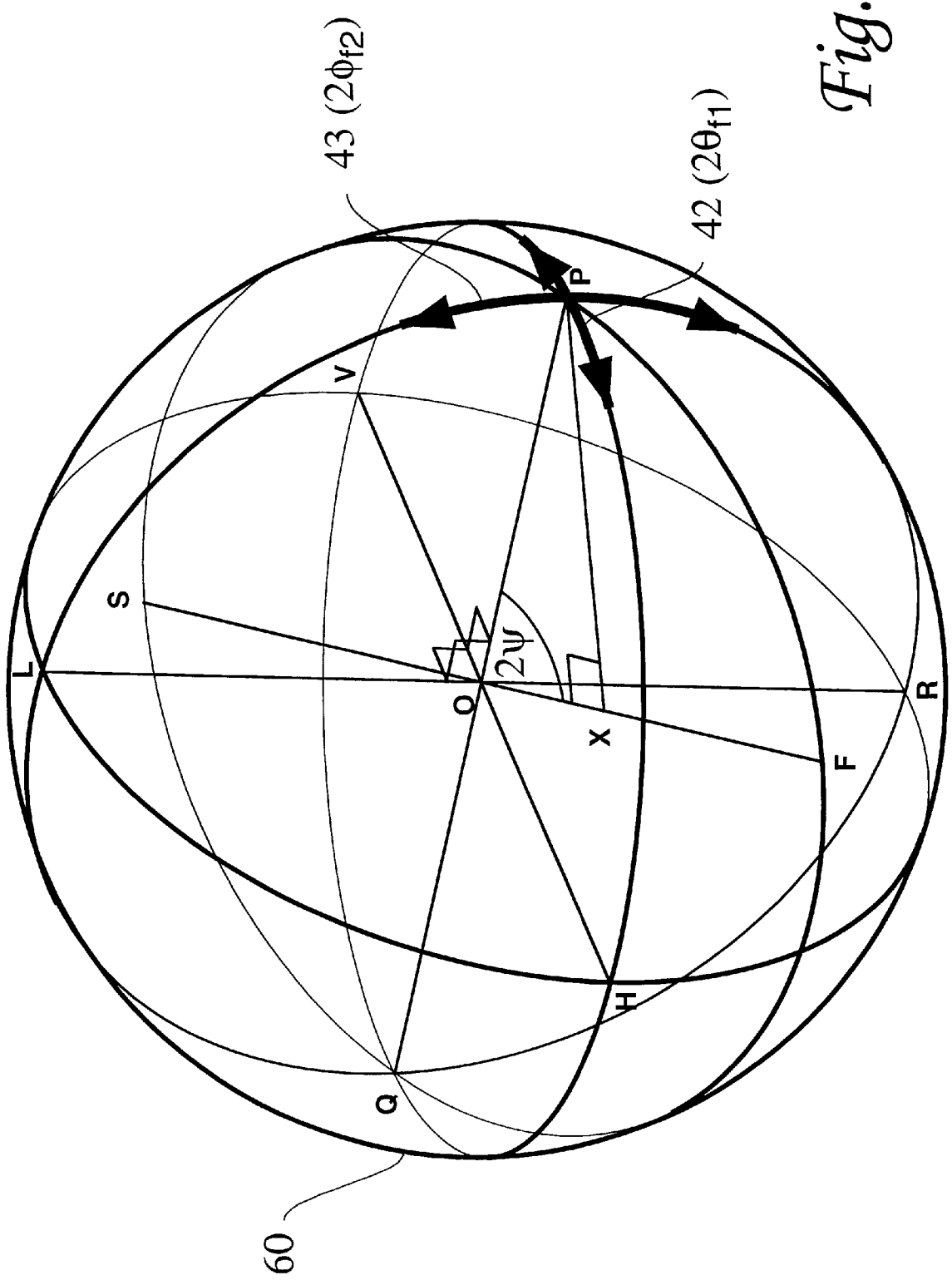

Referring now to the Poincaré sphere 60 of FIG. 6, it is assumed, for simplicity of analysis, that the output from the SOP modulator is applied directly to the input of the PMD transmission path 12 without any intervening change of SOP. Accordingly the input SOP to the transmission path has a mean state corresponding to the linearly polarised state P. The transmission path has fast and slow IPSPs (launch principal SOPs) that in the course of time are liable to wander all over the surface of their sphere while at all time remaining diametrically opposed to each other. At some instant these fast and slow IPSPs may be represented in the Poincaré sphere respectively at locations F and S.

Ignoring in the first instance the polarisation state modulations at frequencies $f_1$ and $f_2$, light is being launched into the PMD transmission path 12 with an SOP given by point P, and at this instant neither of the IPSPs is coincident with P. Therefore some of the light propagates through the transmission path 12 with the fast transit time, while the remainder propagates through with the slow transit time. The amplitudes of the fast and slow components is determined by the angle $P\hat{O}S=2\psi$ between the PQ and FS axes. The amplitude of the fast component varies with $\sin 2\psi$, while that of the slow component varies with $\cos 2\psi$.

The effect of the SOP modulations at frequencies $f_1$ and $f_2$ is to produce a modulation of the division of optical power between the component propagating through the PMD transmission path with the fast transit time and the component propagating through it with the slow transit time. The manner in which the arises may easily be seen by considering certain specific orientations of the FS axis defined by the IPSPs. If this FS axis is aligned with the HV axis, then $2\psi=\pi/2$, with the result that the launch power is divided equally between the component propagating through the PMD transmission path 12 with the fast transit time, and the component propagating with the slow transit time. The SOP modulation at frequency $f_2$ described by arc 43 does not involve any modulation of the angle $2\psi$, and therefore the division of power between the fast and slow transit time components is unaffected by this SOP modulation at frequency $f_2$. This SOP modulation at frequency $f_2$ described by arc 43 will similarly involve no modulation of the angle $2\psi$ for any orientation of the FS axis lying in the equatorial plane containing HQV and P. On the other hand, the SOP modulation at frequency $f_1$ described by arc 42 will produce a corresponding modulation (by$\pm\theta$) of the angle $2\psi$, and so will produce a corresponding modulation of the division of power between the fast and slow transit time components propagating through the PMD transmission path 12. When $2\psi=\pi/2$ (i.e. when the FS and HV axes are aligned) the division of power modulation is, for small values of $\theta$, related approximately linearly to the SOP modulation frequency $f_1$, and so the ratio of the division of power modulation at $2f_1$ to that at $f_1$ is small. This ratio increases to a maximum as the orientation of the FS is swept round in the equatorial plane into alignment with the PQ axis (i.e. as $2\psi$ is reduced from $2\psi=\pi/2$ to $2\psi=0$).

Figure 7:
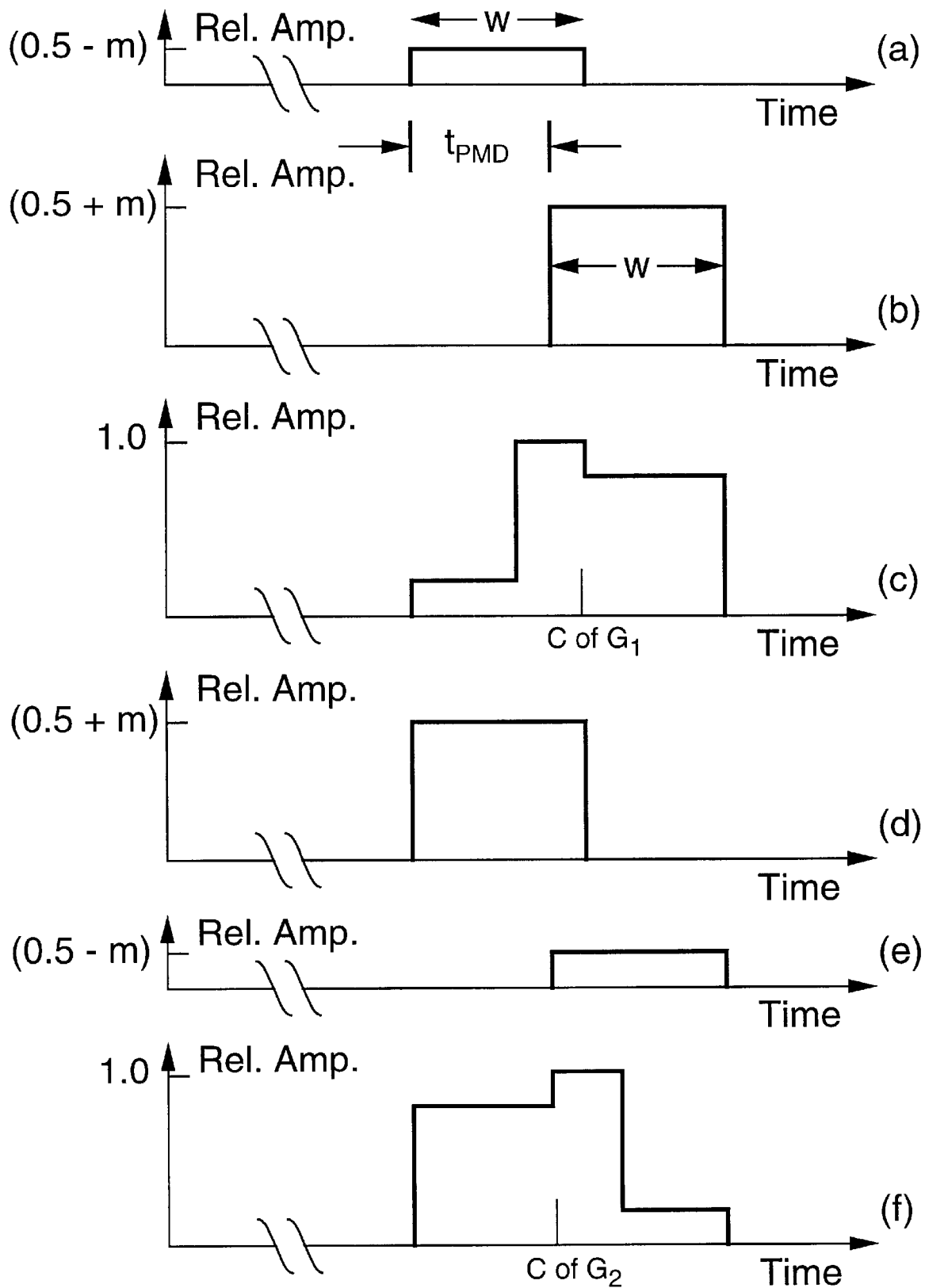
FIGS. 7 depicts a set of timing diagrams illustrating how the alteration of the division of power between the fast and slow transit time components of pulses suffering PMD affects the timing of their centres of gravity.

Attention is now returned to the situation in which the FS axis is aligned with the HV axis and a pulse of light of pulse width ω is launched into the PMD transmission path 12 from the transmitter 11. The angle $2\psi=\pi/2$, and so when the pulse emerges from the far end of the PMD transmission path 12, it is found to be composed of two equal amplitude components which have propagated through the transmission path 12 with different transit times. The ISOP modulation at $f_1$ described by arc 42 modulates the angle $2\psi$ over the range $\pi/2\pm\theta$. The timing diagrams (a) and (b) of FIG. 7 depict the response of the photodetector 30 respectively to the arrival at the receiver 10 of the fast transit time component and to that of the slow transit time component for the launch SOP condition corresponding to the end of the arc 42 that is nearer V, i.e. when $2\psi=\pi/2+\theta$. The response to the fast transit time component is ahead of that to the slow transit time component by the differential group delay time $t_{DGD}$, which is the polarisation mode dispersion of the transmission path 12. Because in this instance $2\psi>\pi/2$, the relative amplitude of the response of the photodetector 30 to the fast transit time component (0.5−m) is smaller than that of its response to the slow transit time component (0.5+m). The resultant of these two responses is shown in timing diagram (c) of FIG. 7, and it can readily be shown that the centre of gravity, CofG$_1$, of this resultant response is delayed m×t$_{DGD}$ with respect to the centre of gravity (not shown) pertaining when $2\psi=\pi/2$.

The timing diagrams (d) and (e) of FIG. 9 depict the response of the photodetector 30 respectively to the arrival of the fast and slow transit time components for the launch SOP condition corresponding to the other end of the arc 42, the end nearer H, i.e. when $2\psi=\pi/2-\theta$. The resultant of these two responses is shown in timing diagram (f) of FIG. 7, and it can readily be shown that the centre of gravity, CofG$_2$, of this resultant response is advanced m×t$_{DGD}$ with respect to the centre of gravity pertaining where $2\psi=\pi/2$.

The clock extraction circuit 33 produces clock pulses that have a centre of gravity centred on the average timing of a preceding train of pulses, and so it is seen that, provided that frequency $f_1$ is long compared with the duration of the pulse train averaged by the clock extraction circuit, the clock output will have a modulation component at frequency $f_1$ whose amplitude is directly related to the magnitude of the PMD exhibited by transmission path 12.

From the foregoing, it is evident that, if the SOP modulation amplitude θ is known, it is in principle possible to determine the magnitude of the PMD exhibited by transmission path to be determined from a measure of the magnitude of the f1 component of the extracted clock signal whenever the IPSPs are known to be aligned with the HV axis. On its own, this lacks practical utility in the absence of knowledge as to when the IPSPs are so aligned with the HV axis, but the situation can be somewhat generalised by additionally taking into account the amplitudes of the components of the clock output at frequencies f2 and 2f2. By including knowledge of the magnitudes of these two additional variables it is possible to determine the magnitude of the PMD for any orientation of the IPSP axis.

To derive the relationship between DGD magnitude and the f and 2f peak-to-peak amplitudes present in the extracted clock signal, the ensuing analysis assumes that the DGD has a magnitude T, and that the angle subtended at the centre of the Poincaré sphere between the SOP of the light launched into the transmission path 12 and the slow transit tme IPSP is, in the absence of any SOP modulation, the angle α ($\alpha=\pi-2\psi$). The fraction of the power launched into the slow transit time mode is therefore $\cos^2(\alpha/2)$, and the fraction launched into the fast transit time mode is $\sin^2(\alpha/2)$. At the far end of the transmission path 12 the phase of this light is given by the weighted sum of the two contributions, and is given by:

$$\Phi = \tfrac{1}{2}T \cos \alpha \qquad (1)$$

(measuring phase with respect to the condition pertaining when the SOP of the launched light is such that the fast and slow components are of equal amplitude). It is now assumed that the $f_1$ SOP modulation is modulation described by an arc along a Poincaré great circle inclined at an angle β to the great circle containing the (unmodulated) launch SOP and the two IPSPs, this modulation having a modulation depth $\Delta\alpha_1$. The clock phase now becomes:

$$\Phi = \tfrac{1}{2}T\cos(\alpha+\Delta\alpha_1 \sin \omega_1 t \cos \beta) \qquad (2)$$

where $f_1 = 2\pi\omega_1$

Then, when the $f_2$ SOP modulation is also taken into account, the clock phase becomes:

$$\Phi = \tfrac{1}{2}T \cos(\alpha+\Delta\alpha_1 \sin \omega_1 t \cos \beta + \Delta\alpha_2 \sin \omega_2 t \sin \beta) \qquad (3)$$

where $f_2=2\pi\omega_2$, and where the $f_2$ modulation has a modulation depth $\Delta\alpha_2$.

Under the assumption that $$\Delta\alpha_1 = \Delta\alpha_2 = \Delta\alpha \ll 1,$$

$$\Phi \approx \tfrac{1}{2}T \cos \alpha \{1 - \tfrac{1}{4}(\Delta\alpha)^2 - (\Delta\alpha)^2 \sin \beta \cos \beta[\cos(\omega_1 t - \omega_2 t) - \cos \omega_1 t + \omega_2 t)]\}$$

$$- \tfrac{1}{8}T\{(\Delta\alpha)^2 \cos(2\omega_1 t) \cos^2 \beta + (\Delta\alpha)^2 \cos(2\omega_2 t) \sin^2 \beta\} -$$

$$\tfrac{1}{2}T \sin \alpha \{\Delta\alpha \sin(\omega_1 t) \cos \beta + \Delta\alpha \sin(\omega_2 t) \sin \beta\} \qquad (4)$$

The above has the following amplitude components at frequencies $f_1$, $f_2$, $2f_1$ and $2f_2$:

$$A_{1f1} = \tfrac{1}{2}T \sin \alpha \, \Delta\alpha \cos \beta \qquad (5)$$

$$A_{1f2} = \tfrac{1}{2}T \sin \alpha \, \Delta\alpha \sin \beta \qquad (6)$$

$$A_{2f1} = \tfrac{1}{8}T(\Delta\alpha)^2 \cos \alpha \cos^2 \beta \qquad (7)$$

$$A_{2f2} = \tfrac{1}{8}T(\Delta\alpha)^2 \cos \alpha \sin^2 \beta \qquad (8)$$

where $A_{1f1}$, $A_{1f2}$, $A_{2f1}$ and $A_{2f2}$ are the amplitudes of the components respectively at frequencies $f_1$, $f_2$, $2f_1$ and $2f_2$.

From (7) and (8)

$$T \cos \alpha = 8(A_{2f1} + A_{2f2})/(\Delta\alpha)^2 \qquad (9)$$

From (5) and (6)

$$T^2 \sin^2 \alpha = 4(A^2_{1f1} + A^2_{1f2})/(\Delta\alpha)^2 \qquad (10)$$

From (9) and (10)

$$T = 2\{(A^2_{1f1} + A^2_{1f2})/(\Delta\alpha)^2 + 16(A_{2f1} + A^2_{2f2})^2/(\Delta\alpha)^4\}^{1/2} \qquad (11)$$

The choice of suitable frequencies $f_1$ and $f_2$ with which to modulate (dither) the SOP at the transmitter 11 depends upon a number of factors. One of these is the form of filtering 34 at the receiver 10. The noise characteristics of such filtering are an important consideration. If phase locked loop filtering is employed, 1/f noise is the dominating noise source, and in such circumstances choosing a high modulation frequency provides a good signal to noise ratio, but the choice of frequency must be kept within the bandwidth constraints of the particular form of SOP modulator employed. As an example, when using a lithium niobate SOP modulator, the choice of SOP modulation frequencies in the neighbourhood of 10 kHz may be preferred, operating with a modulation depth corresponding to an arc on the Poincaré sphere subtending at its centre an angle in the region of 10°.

The foregoing analysis has been predicated on the SOP of the light being launched into the SOP modulator 21 being known and, without loss of generality, the analysis developed by way of specific example for the case in which this known SOP is a linearly polarised state arbitrarily represented by the point P on the Poincaré sphere. If however for some reason the SOP with which light is launched into the SOP modulator 21 is not known, or is liable to vary with time, then it could be possible for this launch SOP to become aligned with the eigenaxis of one of the two variable strength birefringence elements of the SOP modulator 21. Under these conditions the modulation of the birefringence strength of that particular element would produce no corresponding modulation of the output SOP of the SOP modulator. The problem that this possibility presents can however be circumvented by providing the SOP modulator 21 with a third variable strength birefringence element modulated at a frequency $f_3$, where $f_1 \ne f_3 \ne f_2$, $2f_1 \ne f_3 \ne f_2$ and $f_1 \ne 2f_3 \ne f_2$, and arranged so that its eigenaxis is orthogonal with respect to the eigenaxes of the other two variable strength birefringence elements of SOP modulator 21.

By choosing also to modulate the wavelength of the signal launched into the transmission path 12, and then choosing to look also at the way the amplitudes of the $f_1$, $2f_1$, $f_2$, and $2f_2$ components of the extracted clock signal vary with the wavelength modulation frequency, it is possible additionally to derive a second order PMD measurement.

What is claimed is:

1. A method of measuring the polarisation mode dispersion (PMD) of an optical transmission path, in which method a clocked digital optically polarised signal is launched into one end of said transmission path with a state of polarisation (SOP) that is modulated in a manner which, when represented on a Poincaré sphere, has an oscillatory rotational component at a frequency $f_1$ about a first axis of the sphere and an oscillatory rotational component at a frequency $f_2$ about a second axis of the sphere that is orthogonal to said first axis, and where $f_1 \ne f_2$, $f_1 \ne 2f_2$, and $f_2 \ne 2f_1$, wherein at the other end of said transmission path the clocked digital optical signal emergent therefrom is detected by a photodetector and fed to a clock extraction circuit to provide a clock signal, and wherein said clock signal is analysed to determine the magnitudes of its components at $f_1$, $2f_1$, $f_2$, and $2f_2$.

2. A method as claimed in claim 1, wherein said clocked digital optically polarised signal that is launched into said one end of said transmission path is a signal having a wavelength which is modulated, and wherein said clock signal is analysed to determine the resulting modulation, at the wavelength modulation frequency, of the magnitudes of its components at $f_1$, $2f_1$, $f_2$, and $2f_2$ to provide a second order PMD measurement.

3. Apparatus for measuring polarisation mode dispersion (PMD) of an optical path having two ends, the apparatus comprising:

a photodetector arranged to be coupled to a first end of the optical path whereby to receive a clocked digital optically polarised signal launched into the other end of said transmission path with a state of polarisation (SOP) that is modulated in a manner which, when represented on a Poincaré sphere, has an oscillatory rotational component at a frequency $f_1$ about a first axis of the sphere and an oscillatory rotational component at a frequency $f_2$ about a second axis of the sphere that is orthogonal to said first axis, and where $f_1 \ne f_2$, $f_1 \ne 2f_2$, and $f_2 \ne 2f_1$;

a clock extraction circuit arranged to receive an output from the photodetector and to provide a clock signal responsive thereto; a circuit arranged to analyse the clock signal to determine the magnitude of the components at $f_1$, $2f_1$, $f_2$, and $2f_2$.

4. A method as claimed in claim 3, wherein said clocked digital optically polarised signal that is launched into said one end of said transmission path is a signal having a wavelength which is modulated, and wherein said clock signal is analysed to determine the resulting modulation, at the wavelength modulation frequency, of the magnitudes of its components at $f_1$, $2f_1$, $f_2$, and $2f_2$ to provide a second order PMD measurement.

* * * * *